US009659433B2

(12) United States Patent
Chun

(10) Patent No.: US 9,659,433 B2
(45) Date of Patent: May 23, 2017

(54) SYSTEM AND METHOD FOR PROVIDING REMOTE WAGERING GAMES IN A LIVE TABLE GAME SYSTEM

(71) Applicant: IGT, Las Vegas, NV (US)

(72) Inventor: Jay Chun, Hong Kong (CN)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 15/205,842

(22) Filed: Jul. 8, 2016

(65) Prior Publication Data

US 2016/0321860 A1 Nov. 3, 2016

Related U.S. Application Data

(63) Continuation of application No. 14/043,184, filed on Oct. 1, 2013, now Pat. No. 9,390,592.

(60) Provisional application No. 61/708,865, filed on Oct. 2, 2012.

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.

CPC ........ *G07F 17/3213* (2013.01); *G07F 17/322* (2013.01); *G07F 17/3223* (2013.01); *G07F 17/3244* (2013.01); *G07F 17/3293* (2013.01); *G07F 17/34* (2013.01)

(58) Field of Classification Search

CPC .. G06F 17/32; G06F 17/3213; G06F 17/3272; G06F 17/3288; G06F 17/3293; A63F 2001/003

USPC .......................................................... 463/11

See application file for complete search history.

(56) References Cited

U.S. PATENT DOCUMENTS

| | | | |
|---|---|---|---|
| 3,708,219 | A | 1/1973 | Forlini et al. |
| 3,998,309 | A | 12/1976 | Mandas et al. |
| 4,095,795 | A | 6/1978 | Saxton |
| 4,333,715 | A | 6/1982 | Brooks |
| 4,337,945 | A | 7/1982 | Levy |
| 4,448,419 | A | 5/1984 | Telnaes |
| 4,467,424 | A | 8/1984 | Hedges et al. |
| 4,517,558 | A | 5/1985 | Davids |
| 4,607,844 | A | 8/1986 | Fullerton |
| 4,621,814 | A | 11/1986 | Stepan et al. |
| 4,659,182 | A | 4/1987 | Aizawa |
| 4,662,635 | A | 5/1987 | Enokian |
| 4,718,672 | A | 1/1988 | Okada |
| 4,805,907 | A | 2/1989 | Hagiwara |
| 4,856,787 | A | 8/1989 | Itkis |
| 4,858,932 | A | 8/1989 | Keane |

(Continued)

FOREIGN PATENT DOCUMENTS

| | | |
|---|---|---|
| EP | 0478412 | 4/1992 |
| GB | 2403429 | 7/2006 |

(Continued)

*Primary Examiner* — Allen Chan

(74) *Attorney, Agent, or Firm* — Neal, Gerber & Eisenberg LLP

(57) ABSTRACT

Systems and methods for conducting multiple remote wagering games in a live table game system or similar system wherein the gaming symbols which are randomly generated as a result of a live table game are used to resolve the live table game and simulate play and resolve wagering outcomes of one or more remote wagering games which differ from the live table game.

17 Claims, 2 Drawing Sheets

(56) References Cited

U.S. PATENT DOCUMENTS 4,911,449 A 3/1990 Dickinson et al.
4,912,548 A 3/1990 Shanker et al.
5,086,354 A 2/1992 Bass et al.
5,113,272 A 5/1992 Reamey
5,132,839 A 7/1992 Travis
5,248,142 A 9/1993 Breeding
5,288,081 A 2/1994 Breeding
5,319,491 A 6/1994 Selbrede
5,325,830 A 7/1994 Hammer
5,342,047 A 8/1994 Heidel et al.
5,364,100 A 11/1994 Ludlow et al.
5,376,587 A 12/1994 Buchmann et al.
5,393,061 A 2/1995 Manship et al.
5,456,465 A 10/1995 Durham
5,467,893 A 11/1995 Landis et al.
5,472,194 A 12/1995 Breeding et al.
5,490,670 A 2/1996 Hobert
5,494,296 A 2/1996 Grassa
5,539,547 A 7/1996 Ishii et al.
5,544,892 A 8/1996 Breeding
5,580,055 A 12/1996 Hagiwara
5,580,310 A 12/1996 Orus et al.
5,585,821 A 12/1996 Ishikura et al.
5,586,937 A 12/1996 Menashe
5,588,650 A 12/1996 Eman et al.
5,589,980 A 12/1996 Bass et al.
5,611,730 A 3/1997 Weiss
5,613,909 A 3/1997 Stelovsky
5,618,232 A 4/1997 Martin
5,643,086 A 7/1997 Alcorn et al.
5,655,961 A 8/1997 Acres et al.
5,722,890 A 3/1998 Libby et al.
5,743,523 A 4/1998 Kelly et al.
5,743,798 A 4/1998 Adams et al.
5,745,197 A 4/1998 Leung et al.
5,752,881 A 5/1998 Inoue
5,752,882 A 5/1998 Acres et al.
5,759,103 A 6/1998 Freels et al.
5,762,552 A 6/1998 Vuong et al.
5,764,317 A 6/1998 Sadovnik et al.
5,766,076 A 6/1998 Pease et al.
5,772,509 A 6/1998 Weiss
RE35,864 E 7/1998 Weingardt
5,782,692 A 7/1998 Stelovsky
5,788,574 A 8/1998 Ornstein et al.
5,791,992 A 8/1998 Crump et al.
5,795,225 A 8/1998 Jones et al.
5,797,795 A 8/1998 Takemoto et al.
5,800,268 A 9/1998 Molnick
5,803,451 A 9/1998 Kelly et al.
5,820,459 A 10/1998 Acres et al.
5,820,461 A 10/1998 Pernatozzi
5,830,067 A 11/1998 Graves et al.
5,836,817 A 11/1998 Acres et al.
5,839,730 A 11/1998 Pike
5,839,731 A 11/1998 Feola
5,851,149 A 12/1998 Xidos et al.
5,873,781 A 2/1999 Keane
5,885,085 A 3/1999 Fujita
5,888,136 A 3/1999 Herbert
5,910,046 A 6/1999 Wada et al.
5,911,626 A 6/1999 McCrea, Jr.
5,931,471 A 8/1999 Bonito
5,951,397 A 9/1999 Dickinson
5,956,180 A 9/1999 Bass et al.
5,967,893 A 10/1999 Lawrence et al.
6,001,016 A 12/1999 Walker et al.
6,015,346 A 1/2000 Bennett
6,019,374 A 2/2000 Breeding
6,027,115 A 2/2000 Griswold et al.
6,039,650 A 3/2000 Hill
6,050,895 A 4/2000 Luciano et al.
6,054,969 A 4/2000 Haisma
6,056,641 A 5/2000 Webb
6,059,658 A 5/2000 Mangano et al.
6,080,063 A 6/2000 Khosla
6,083,105 A 7/2000 Ronin et al.
6,113,493 A 9/2000 Walker et al.
6,135,884 A 10/2000 Hedrick et al.
6,142,876 A 11/2000 Cumbers
6,149,522 A 11/2000 Alcorn et al.
6,159,098 A 12/2000 Slomiany et al.
6,165,069 A 12/2000 Sines et al.
6,213,875 B1 4/2001 Suzuki
6,244,596 B1 6/2001 Kondratjuk
6,251,014 B1 6/2001 Stockdale et al.
6,252,707 B1 6/2001 Kleinberger et al.
6,254,481 B1 7/2001 Jaffe
6,264,561 B1 7/2001 Saffari
6,312,334 B1 11/2001 Yoseloff
6,315,666 B1 11/2001 Mastera et al.
6,336,857 B1 1/2002 McBride
6,337,513 B1 1/2002 Clevenger et al.
6,347,996 B1 2/2002 Gilmore et al.
6,368,216 B1 4/2002 Hedrick et al.
6,379,244 B1 4/2002 Sagawa et al.
6,394,907 B1 5/2002 Rowe
6,398,220 B1 6/2002 Inoue
6,416,827 B1 7/2002 Chakrapani et al.
6,435,970 B1 8/2002 Baerlocher et al.
6,444,496 B1 9/2002 Edwards et al.
6,445,185 B1 9/2002 Damadian et al.
6,491,583 B1 12/2002 Gauselmann
6,503,147 B1 1/2003 Stockdale et al.
6,508,709 B1 1/2003 Karmarkar
6,511,375 B1 1/2003 Kaminkow
6,512,559 B1 1/2003 Hashimoto et al.
6,514,141 B1 2/2003 Kaminkow et al.
6,517,073 B1 2/2003 Vancura
6,517,433 B2 2/2003 Loose et al.
6,517,437 B1 2/2003 Wells et al.
6,547,664 B2 4/2003 Saunders
6,575,541 B1 6/2003 Hedrick et al.
6,575,834 B1 6/2003 Lindo
6,585,591 B1 7/2003 Baerlocher et al.
6,607,195 B2 8/2003 Vancura
D480,961 S 10/2003 Deadman
6,646,695 B1 11/2003 Gauselmann
6,652,378 B2 11/2003 Cannon et al.
6,659,864 B2 12/2003 McGahn et al.
6,661,425 B1 12/2003 Hiroaki
6,676,517 B2 1/2004 Beavers
6,685,567 B2 2/2004 Cockerille et al.
6,695,703 B1 2/2004 McGahn
6,702,675 B2 3/2004 Poole et al.
6,712,694 B1 3/2004 Nordman
6,715,756 B2 4/2004 Inoue
6,717,728 B2 4/2004 Putilin
6,722,979 B2 4/2004 Gilmore et al.
6,726,565 B2 4/2004 Hughs-Baird
6,789,801 B2 9/2004 Snow
6,802,777 B2 10/2004 Seelig et al.
6,804,763 B1 10/2004 Stockdale et al.
6,817,945 B2 11/2004 Seelig et al.
6,817,946 B2 11/2004 Motegi et al.
6,863,608 B1 3/2005 LeMay et al.
6,866,586 B2 3/2005 Oberberger et al.
6,887,157 B2 5/2005 LeMay et al.
6,890,259 B2 5/2005 Breckner et al.
6,906,762 B1 6/2005 Witehira et al.
6,937,298 B2 8/2005 Okada
7,029,395 B1 4/2006 Baerlocher
7,128,647 B2 10/2006 Muir
7,204,753 B2 4/2007 Ozaki et al.
7,220,181 B2 5/2007 Okada
7,252,288 B2 8/2007 Seelig et al.
7,255,643 B2 8/2007 Ozaki et al.
7,303,473 B2 12/2007 Rowe
7,309,284 B2 12/2007 Griswold et al.
7,322,884 B2 1/2008 Emori et al.
7,326,115 B2 2/2008 Baerlocher
7,329,179 B2 2/2008 Baerlocher
7,329,181 B2 2/2008 Hoshino et al.
7,351,146 B2 4/2008 Kaminkow

(56) References Cited

U.S. PATENT DOCUMENTS

| | | | |
|---|---|---|---|
| 7,387,570 | B2 | 6/2008 | Randall |
| 7,452,270 | B2 | 11/2008 | Walker et al. |
| 7,465,227 | B2 | 12/2008 | Baerlocher |
| 7,470,185 | B2 | 12/2008 | Baerlocher |
| 7,488,251 | B2 | 2/2009 | Kaminkow |
| 7,503,849 | B2 | 3/2009 | Hornik et al. |
| 7,537,456 | B2 | 5/2009 | Snow |
| 7,566,274 | B2 | 7/2009 | Johnson et al. |
| 7,575,512 | B2 | 8/2009 | Kennedy |
| 7,591,726 | B2 | 9/2009 | Baerlocher et al. |
| 7,618,319 | B2 | 11/2009 | Casey et al. |
| 7,666,086 | B2 | 2/2010 | Baerlocher |
| 7,666,087 | B2 | 2/2010 | Hughs-Baird |
| 7,699,698 | B2 | 4/2010 | Randall |
| 7,753,798 | B2 | 7/2010 | Soltys et al. |
| 7,758,419 | B2 | 7/2010 | Rowe et al. |
| 7,775,524 | B2 | 8/2010 | Lutnick et al. |
| 7,789,743 | B2 | 9/2010 | Walker et al. |
| 7,819,744 | B2 | 10/2010 | Hughs-Baird |
| 7,822,641 | B2 | 10/2010 | Abbott et al. |
| 7,828,643 | B2 | 11/2010 | Baerlocher |
| 7,837,547 | B2 | 11/2010 | Cannon |
| 7,846,018 | B2 | 12/2010 | Baerlocher |
| 7,867,077 | B2 | 1/2011 | Baerlocher et al. |
| 7,878,892 | B2 | 2/2011 | Sines et al. |
| 7,905,771 | B2 | 3/2011 | Walker et al. |
| 7,905,774 | B2 | 3/2011 | Walker et al. |
| 7,914,372 | B2 | 3/2011 | Tessmer et al. |
| 7,931,531 | B2 | 4/2011 | Oberberger |
| 7,950,993 | B2 | 5/2011 | Oberberger |
| 7,963,845 | B2 | 6/2011 | Baerlocher |
| 7,967,674 | B2 | 6/2011 | Baerlocher |
| 7,976,378 | B2 | 7/2011 | Baerlocher |
| 7,980,948 | B2 | 7/2011 | Rowe et al. |
| 8,020,866 | B2 | 9/2011 | Walker et al. |
| 8,066,564 | B2 | 11/2011 | Randall |
| 8,087,999 | B2 | 1/2012 | Oberberger et al. |
| 8,109,821 | B2 | 2/2012 | Kovacs et al. |
| 8,128,491 | B2 | 3/2012 | Vasquez et al. |
| 8,128,492 | B2 | 3/2012 | Vasquez et al. |
| 8,152,624 | B2 | 4/2012 | Gerrard et al. |
| 8,152,629 | B2 | 4/2012 | DeWaal et al. |
| 8,167,711 | B2 | 5/2012 | Baerlocher |
| 8,172,660 | B2 | 5/2012 | Lancaster et al. |
| 8,177,627 | B2 | 5/2012 | Baerlocher |
| 8,182,323 | B2 | 5/2012 | Okada |
| 8,197,335 | B2 | 6/2012 | DeWaal et al. |
| 8,202,153 | B2 | 6/2012 | Baerlocher |
| 8,206,212 | B2 | 6/2012 | Iddings et al. |
| 8,231,456 | B2 | 7/2012 | Zielinski |
| 8,235,801 | B2 | 8/2012 | Tan |
| 8,267,765 | B2 | 9/2012 | Baerlocher |
| 8,305,550 | B2 | 11/2012 | Jung et al. |
| 8,313,373 | B2 | 11/2012 | Walker et al. |
| 8,317,589 | B2 | 11/2012 | Tessmer et al. |
| 8,342,954 | B2 | 1/2013 | Oberberger et al. |
| 8,360,852 | B2 | 1/2013 | Randall |
| 8,360,859 | B2 | 1/2013 | Walker et al. |
| 8,403,740 | B2 | 3/2013 | Kovacs et al. |
| 8,425,305 | B2 | 4/2013 | Baerlocher et al. |
| 8,430,735 | B2 | 4/2013 | Oberberger |
| 8,430,739 | B2 | 4/2013 | Rodgers |
| 8,454,427 | B2 | 6/2013 | Baerlocher |
| 8,460,095 | B2 | 6/2013 | Tan |
| 8,474,820 | B2 | 7/2013 | Walker et al. |
| 8,485,888 | B2 | 7/2013 | Baerlocher |
| 8,496,521 | B2 | 7/2013 | Randall |
| 8,500,533 | B2 | 8/2013 | Lutnick et al. |
| 8,506,380 | B2 | 8/2013 | Hughes et al. |
| 8,517,824 | B2 | 8/2013 | Zielinski et al. |
| 8,613,650 | B2 | 12/2013 | Kovacs et al. |
| 9,135,775 | B2 | 9/2015 | Pececnik |
| 9,214,056 | B2 | 12/2015 | Kovacs et al. |
| 2001/0013681 | A1 | 8/2001 | Bruzzese et al. |
| 2002/0045472 | A1 | 4/2002 | Adams |
| 2002/0068635 | A1 | 6/2002 | Hill |
| 2002/0077712 | A1 | 6/2002 | Safaei et al. |
| 2002/0094869 | A1 | 7/2002 | Harkham |
| 2002/0173354 | A1 | 11/2002 | Winans et al. |
| 2003/0013510 | A1* | 1/2003 | Vuong .................... G07F 17/32 463/13 |
| 2003/0027624 | A1 | 2/2003 | Gilmore et al. |
| 2003/0032478 | A1 | 2/2003 | Takahama et al. |
| 2003/0032479 | A1 | 2/2003 | LeMay et al. |
| 2003/0060271 | A1 | 3/2003 | Gilmore et al. |
| 2003/0073497 | A1 | 4/2003 | Nelson |
| 2003/0087690 | A1 | 5/2003 | Loose et al. |
| 2003/0130028 | A1 | 7/2003 | Aida et al. |
| 2003/0176214 | A1 | 9/2003 | Burak et al. |
| 2003/0203756 | A1 | 10/2003 | Jackson |
| 2003/0224854 | A1 | 12/2003 | Joao |
| 2003/0234489 | A1 | 12/2003 | Okada |
| 2003/0236114 | A1 | 12/2003 | Griswold et al. |
| 2003/0236118 | A1 | 12/2003 | Okada |
| 2004/0002379 | A1 | 1/2004 | Parrott et al. |
| 2004/0023714 | A1 | 2/2004 | Asdale |
| 2004/0029636 | A1 | 2/2004 | Wells |
| 2004/0063490 | A1 | 4/2004 | Okada |
| 2004/0066475 | A1 | 4/2004 | Searle |
| 2004/0070146 | A1 | 4/2004 | Snow |
| 2004/0084843 | A1 | 5/2004 | Snow |
| 2004/0090003 | A1 | 5/2004 | Snow |
| 2004/0090005 | A1 | 5/2004 | Snow |
| 2004/0116178 | A1 | 6/2004 | Okada |
| 2004/0145116 | A1 | 7/2004 | Calvo et al. |
| 2004/0147303 | A1 | 7/2004 | Imura et al. |
| 2004/0147314 | A1 | 7/2004 | LeMay et al. |
| 2004/0150162 | A1 | 8/2004 | Okada |
| 2004/0162146 | A1 | 8/2004 | Ooto |
| 2004/0166925 | A1 | 8/2004 | Emori et al. |
| 2004/0171423 | A1 | 9/2004 | Silva et al. |
| 2004/0183972 | A1 | 9/2004 | Bell |
| 2004/0192430 | A1 | 9/2004 | Burak et al. |
| 2004/0198485 | A1 | 10/2004 | Loose et al. |
| 2004/0207154 | A1 | 10/2004 | Okada |
| 2004/0209666 | A1 | 10/2004 | Tashiro |
| 2004/0209667 | A1 | 10/2004 | Emori et al. |
| 2004/0209668 | A1 | 10/2004 | Okada |
| 2004/0209671 | A1 | 10/2004 | Okada |
| 2004/0209678 | A1 | 10/2004 | Okada |
| 2004/0209683 | A1 | 10/2004 | Okada |
| 2004/0214635 | A1 | 10/2004 | Okada |
| 2004/0214637 | A1 | 10/2004 | Nonaka |
| 2004/0224747 | A1 | 11/2004 | Okada |
| 2004/0233663 | A1 | 11/2004 | Emslie et al. |
| 2004/0239582 | A1 | 12/2004 | Seymour |
| 2005/0003886 | A1 | 1/2005 | Englman et al. |
| 2005/0032571 | A1 | 2/2005 | Asonuma |
| 2005/0037843 | A1 | 2/2005 | Wells et al. |
| 2005/0049032 | A1 | 3/2005 | Kobayashi |
| 2005/0049046 | A1 | 3/2005 | Kobayashi |
| 2005/0062410 | A1 | 3/2005 | Bell et al. |
| 2005/0063055 | A1 | 3/2005 | Engel |
| 2005/0079913 | A1 | 4/2005 | Inamura |
| 2005/0085292 | A1 | 4/2005 | Inamura |
| 2005/0153772 | A1 | 7/2005 | Griswold et al. |
| 2005/0153775 | A1 | 7/2005 | Griswold et al. |
| 2005/0176493 | A1 | 8/2005 | Nozaki et al. |
| 2005/0176507 | A1 | 8/2005 | Ephrati et al. |
| 2005/0192090 | A1 | 9/2005 | Muir et al. |
| 2005/0192099 | A1 | 9/2005 | Nguyen et al. |
| 2005/0206582 | A1 | 9/2005 | Bell et al. |
| 2005/0208994 | A1 | 9/2005 | Berman |
| 2005/0233799 | A1 | 10/2005 | LeMay et al. |
| 2005/0233803 | A1 | 10/2005 | Yang |
| 2005/0239539 | A1 | 10/2005 | Inamura |
| 2005/0266912 | A1 | 12/2005 | Sekiguchi |
| 2005/0282625 | A1 | 12/2005 | Nicely |
| 2005/0285337 | A1 | 12/2005 | Durham et al. |
| 2006/0030399 | A1 | 2/2006 | Baerlocher |
| 2006/0040733 | A1 | 2/2006 | Baerlocher |
| 2006/0073882 | A1 | 4/2006 | Rozkin et al. |
| 2006/0092170 | A1 | 5/2006 | Bathiche et al. |
| 2006/0100014 | A1 | 5/2006 | Griswold et al. |

(56) References Cited

U.S. PATENT DOCUMENTS

| | | | |
|---|---|---|---|
| 2006/0103951 | A1 | 5/2006 | Bell et al. |
| 2006/0125745 | A1 | 6/2006 | Evanicky |
| 2006/0135240 | A1 | 6/2006 | Barshack |
| 2006/0166727 | A1 | 7/2006 | Burak |
| 2006/0189382 | A1 | 8/2006 | Muir et al. |
| 2006/0191177 | A1 | 8/2006 | Engel |
| 2006/0258446 | A1 | 11/2006 | Nguyen et al. |
| 2006/0284574 | A1 | 12/2006 | Emslie et al. |
| 2006/0290594 | A1 | 12/2006 | Engel et al. |
| 2007/0004510 | A1 | 1/2007 | Underdahl et al. |
| 2007/0010315 | A1 | 1/2007 | Hein |
| 2007/0015583 | A1* | 1/2007 | Tran ........................ G07F 17/32 463/40 |
| 2007/0021198 | A1 | 1/2007 | Muir et al. |
| 2007/0129123 | A1 | 6/2007 | Eryou et al. |
| 2008/0020816 | A1 | 1/2008 | Griswold et al. |
| 2008/0020839 | A1 | 1/2008 | Wells et al. |
| 2008/0020840 | A1 | 1/2008 | Wells et al. |
| 2008/0020841 | A1 | 1/2008 | Wells et al. |
| 2008/0064467 | A1 | 3/2008 | Reiner |
| 2008/0146344 | A1 | 6/2008 | Rowe et al. |
| 2008/0149705 | A1 | 6/2008 | Giobbi et al. |
| 2008/0182650 | A1 | 7/2008 | Randall et al. |
| 2008/0231611 | A1 | 9/2008 | Bathiche et al. |
| 2008/0248865 | A1 | 10/2008 | Tedesco et al. |
| 2008/0305855 | A1 | 12/2008 | Czyzewski et al. |
| 2008/0318668 | A1 | 12/2008 | Ching et al. |
| 2009/0029766 | A1 | 1/2009 | Lutnick et al. |
| 2009/0111573 | A1 | 4/2009 | Iddings |
| 2010/0111820 | A1 | 5/2010 | Natura et al. |
| 2010/0120506 | A1 | 5/2010 | Davis et al. |
| 2010/0130280 | A1 | 5/2010 | Arezina et al. |
| 2010/0234086 | A1 | 9/2010 | Michaelson |
| 2011/0111824 | A1 | 5/2011 | Cuddy et al. |
| 2012/0252564 | A1* | 10/2012 | Moore .................. G07F 17/322 463/25 |

FOREIGN PATENT DOCUMENTS

| | | |
|---|---|---|
| WO | WO 99/19027 | 4/1999 |
| WO | WO 99/42889 | 8/1999 |
| WO | WO 99/44095 | 9/1999 |
| WO | WO 01/09664 | 2/2001 |
| WO | WO 01/15127 | 3/2001 |
| WO | WO 01/15128 | 3/2001 |
| WO | WO 01/15132 | 3/2001 |
| WO | WO 2004/001486 | 12/2003 |
| WO | WO 2004/102520 | 11/2004 |
| WO | WO 2006/034192 | 3/2006 |
| WO | WO 2006/038819 | 4/2006 |
| WO | WO 2007/032945 | 3/2007 |
| WO | WO 2007/073534 | 6/2007 |

* cited by examiner

SYSTEM AND METHOD FOR PROVIDING REMOTE WAGERING GAMES IN A LIVE TABLE GAME SYSTEM

PRIORITY CLAIM

This application is a continuation of, claims priority to and the benefit of U.S. patent application Ser. No. 14/043,184, filed on Oct. 1, 2013, which claims priority to and the benefit of U.S. Provisional Patent Application No. 61/708,865, filed on Oct. 2, 2012, the entire contents of each are incorporated by reference herein.

CROSS REFERENCE TO RELATED APPLICATIONS

This application is related to U.S. patent application Ser. No. 13/042,633, filed on Mar. 8, 2011, which is a continuing application of U.S. patent application Ser. No. 11/497,708, filed on Aug. 1, 2006, and a continuation-in-part of U.S. patent application Ser. No. 11/042,732, filed on Jan. 24, 2005, U.S. patent application Ser. No. 11/198,218, filed on Aug. 5, 2005 and U.S. patent application Ser. No. 11/312,150, filed on Dec. 19, 2005, the entire contents of all applications which are incorporated by this reference.

BACKGROUND

The invention generally relates to systems and methods for providing, conducting and facilitating the play of wagering games.

Wagering games such as baccarat, blackjack, roulette, and various poker-based table games are popular games offered in casinos. These games are generally played on physical gaming tables having felt layouts, or electronic and electro-mechanical gaming machines in which a dealer, playing cards, chips or other gaming elements may be virtual. Each of these platforms have a limited capacity for players to participate in any particular game due to a limited number of player positions or a limitation on physical space about the table.

These limitations have led to the introduction and growing popularity of live table systems with remote gaming terminals that essentially extend the capacity of a live table game to include players in the game. The gaming terminals are therefore configured to facilitate the participation of remotely seated players in a live table game.

While live table systems have increased the capacity for players to participate in live table games, the systems have not increased the wagering game options for players who participate in the live table game. Thus, it can be seen that there is a need in the art for a system and method that, among other things, provides additional wagering game options.

SUMMARY

The invention is generally directed to systems and methods for conducting multiple remote wagering games in a live table game system or similar system wherein the gaming symbols which are randomly generated as a result of a live table game are used to resolve the live table game and to simulate play and resolve wagering outcomes of one or more remote wagering games which differ from the live table game in game rules, pay tables, wager size and/or limitations on minimum and maximum wagers, side bets, progressive prizes, bonus prize, and the like.

Some embodiments of the invention are directed to a method for conducting multiple wagering games in a live-table game system including remote gaming terminals, one or more data communication devices, one or more processors, and one or more data storage devices, the method comprising the steps of: communicating data relating to a live table game available for play, the live table game being associated with one or more wagers, wherein the outcome of the one or more wagers is determinable by comparing a first criteria with a plurality of gaming symbols randomly generated as a result of playing the live table game according to a first game rules; communicating data relating to one or more remote wagering games available for play, the one or more remote wagering games being associated with one or more wagers and one or more second game rules, wherein the outcome of the one or more wagers is determinable by comparing a second criteria with the same plurality of gaming symbols randomly generated as a result of playing the live table game, and wherein one or both of the second criteria and the second game rules differ from the first criteria and first game rules; receiving data relating to one or more wagers placed in connection with a remote wagering game selected from the one or more remote wagering games available for play; receiving the plurality of gaming symbols randomly generated as a result of the play of the live table game; simulating play of the remote wagering game, wherein play is simulated according to the second game rules and the plurality of gaming symbols received; comparing the plurality of gaming symbols received with the second criteria to determine the outcome of the one or more wagers placed; and resolving the one or more wagers by collecting the wager if the second criteria is not satisfied or awarding a payout if the wager is satisfied.

Some embodiments of the aforementioned method further include the step of determining the one or more remote wagering games to be communicated based on the amount of gaming symbols randomly generated as a result of playing the live table.

In some embodiments of the aforementioned method, the second criteria are the same as the first criteria.

In some embodiments of the aforementioned method, the second game rules are the same as the first game rules.

In some embodiments of the aforementioned method, the second criteria comprises the first criteria and a side wager criteria, the side wager criteria being satisfied upon the plurality of gaming symbols randomly generated including one or more preset gaming symbols.

In some embodiments of the aforementioned method, the second criteria comprises a side wager criteria, the side wager criteria being satisfied upon the plurality of gaming symbols randomly generated including one or more preset gaming symbols.

In some embodiments of the aforementioned method, the plurality of gaming symbols randomly generated as a result of playing the live table game resolve the outcome of any wagers placed in the live table game.

In some embodiments of the aforementioned method, the second game rules and second criteria differ from the first game rules and first criteria.

Some embodiments of the aforementioned method further include the step of awarding a payout amount if any one of the one or more wagers placed is won. In some embodiments, the second game rules differ from the first game rules and provide for a different award than the live table game based on the same plurality of gaming symbols randomly generated.

In some embodiments of the aforementioned method, the gaming terminal further comprises a display device in communication with the one or more communication devices and the steps of communicating data further comprise displaying the data on the display device.

In some embodiments of the aforementioned method, the gaming terminal further comprises a display device in communication with the one or more communication devices and the step of simulating play of the remote table game further comprises displaying the simulated play of the remote table game on the display device.

Some embodiments of the invention are also directed to a system for conducting multiple wagering games comprising a plurality of remote gaming terminals having one or more data communication devices, one or more processors, and one or more data storage devices, wherein the system is configured for: communicating data relating to a live table game available for play to the gaming terminals, the live table game being associated with one or more wagers, wherein the outcome of the one or more wagers is determinable by comparing a first criteria with a plurality of gaming symbols randomly generated as a result of playing the live table game according to a first game rules; communicating data relating to one or more remote wagering games available for play to the gaming terminals, the one or more remote wagering games being associated with one or more wagers and one or more second game rules, wherein the outcome of the one or more wagers is determinable by comparing a second criteria with the same plurality of gaming symbols randomly generated as a result of playing the live table, and wherein one or both of the second criteria and the second game rules differ from the first criteria and first game rules; receiving data from a gaming terminal relating to one or more wagers placed in connection with a remote wagering game selected from the one or more remote wagering games available for play; receiving the plurality of gaming symbols randomly generated as a result of the play of the live table game; simulating play of the remote wagering game, wherein play is simulated according to the second game rules and the plurality of gaming symbols received; comparing the plurality of gaming symbols received with the second criteria to determine the outcome of the one or more wagers placed; and resolving the one or more wagers placed by collecting the wager if the second criteria is not satisfied or awarding a payout if the wager is satisfied.

In some embodiments of the aforementioned system, the gaming terminal further comprises a display device in communication with the one or more communication devices.

In some embodiments the aforementioned system further includes one or more communication devices for collecting game play wherein the one or more processors gaming terminal.

Some embodiments of the invention are directed to another method comprising the steps of: communicating data from a gaming server relating to a live table game available for play, the live table game being associated with one or more wagers, wherein the outcome of the one or more wagers is determinable by comparing a first criteria stored in a games database with a plurality of gaming symbols randomly generated as a result of playing the live table game according to a first game rules stored in the games database; communicating data from the gaming server relating to one or more remote wagering games available for play, the one or more remote wagering games being associated with one or more wagers and one or more second game rules stored in the games database, wherein the outcome of the one or more wagers is determinable by comparing a second criteria stored in the games database with the same plurality of gaming symbols randomly generated as a result of playing the live table game, and wherein one or both of the second criteria and the second game rules differ from the first criteria and first game rules; receiving data from a gaming terminal relating to one or more wagers placed in connection with a remote wagering game selected from the one or more remote wagering games available for play; receiving the plurality of gaming symbols randomly generated as a result of the play of the live table game through a data communication device configured for acquiring game play data from the live table game; simulating play of the remote table game, wherein play is simulated by a processor and displayed on a display device at the gaming terminal according to the second game rules and the plurality of gaming symbols received; and the processor comparing the plurality of gaming symbols received with the second criteria to determine the outcome of the one or more wagers placed and facilitating the collection of the wager if the second criteria is not satisfied or the awarding of a payout if the wager is satisfied.

In some embodiments of the aforementioned method, the second criteria and the first criteria are the same.

In some embodiments of the aforementioned method, the second game rules and the first game rules are the same. In some embodiments, the second criteria differ from the first criteria and the second game rules differ from the first game rules.

In some embodiments of the aforementioned method, the second criteria comprises the first criteria and a side wager criteria, the side wager criteria being satisfied upon the plurality of gaming symbols randomly generated including one or more preset gaming symbols.

DETAILED DESCRIPTION OF SOME EMBODIMENTS OF THE INVENTION

The invention includes systems and methods for providing, conducting and facilitating play of multiple wagering games at an electronic platform through the use of randomly generated game play data received from one or more live wagering games. It is contemplated that the multiple wagering games may possess characteristics, such as the wagering opportunities and/or game rules, which differ from the characteristics of the live wagering games.

The invention may be applied to any live table game, such as baccarat, blackjack, roulette, craps, pai gow, sic bo, bingo, card games, or any other type of game having a live or electronic dealer and one or more players seated at a gaming table or electronic gaming platform.

As discussed herein, the invention may also be applied in a live table system that monitors a live table game in which physical or virtual cards are dealt to one or more players at a gaming table, or other gaming elements are employed such as dice, and collects the randomly generated game play data. The game play data collected is used to enable play of the same live table game remotely through gaming terminals. The gaming terminals may be any platform capable of receiving and transmitting data, including "thin-client" platforms or platforms which do not process game play data and "smart" platforms or platforms which process game play data. The gaming terminal maybe stationary, similar to the slot machines or electronic tables commonly seen at the physical casino, or maybe portable electronic devices such as smart phones, computer tablets, portable media players, laptop computers, desktop computers, smart TV, and the like. Additionally, the gaming network they attach to can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art. Thus, players interested in placing wagers on a live-table game are not confined to the gaming table or even the casino floor.

Figure 1:
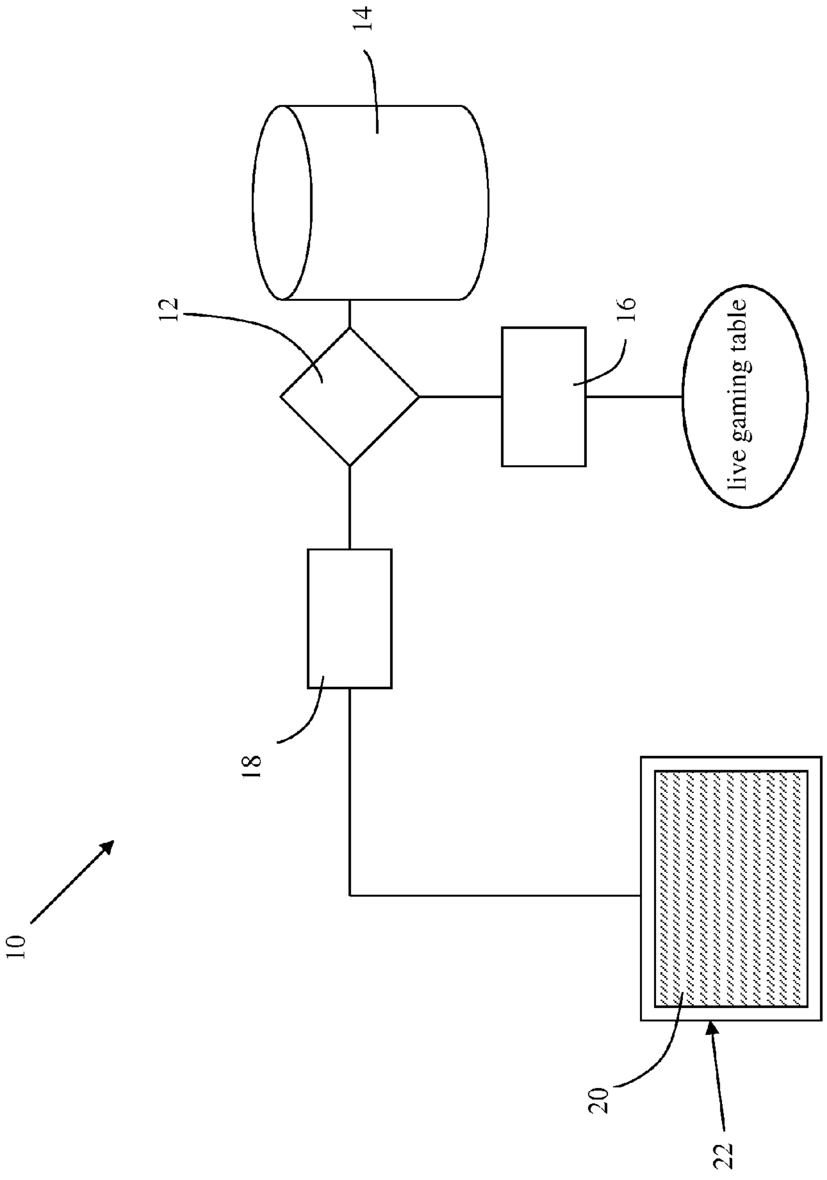
FIG. 1 is a schematic diagram of a system according to some embodiments of the invention.

Referring to FIG. 1, a system 10 for implementing some embodiments of the invention include a processing device 12, a data storage device 14, data input/output devices referred to as "data communication devices" 16 and 18, and a display device 20, some or all of which may be either included in, or in communication with, a remote gaming terminal. For purposes of illustrating some of the embodiments of the invention, data communication device 18 and display device 20 are components of a gaming terminal 22.

The remote gaming terminal may be provided as a kiosk, an interface at an electronic gaming device, a handheld device, cellular phone, or other device networked (locally or via the Internet, for example) to system 10. Data communication device 16 may be positioned at a gaming table and configured for receiving game play data randomly generated during play of the live table game, either through manual input or automatic input of game play information, such as the gaming symbols on the cards dealt, to communication device 16.

For example, game play information may be manually input to data communication device 16 through a manual input device such as a keypad or touchscreen. Alternatively, electronic scanning, recognition and detecting devices known in the art may be used to read cards, determine the location of a roulette ball, or ascertain the results of a dice game, and then automatically transmit the information via communication device 16. Game play information may also be automatically input using a camera mounted over the live table game to obtain game information, or through one or more card reading devices, such as an optical reader mounted in a gaming table, card delivery shoe, or card shuffler, which is capable of decoding the gaming symbols shown on physical playing cards.

Alternatively, in electronic gaming platforms in which physical cards are replaced by virtual cards, the gaming data may derive from the random number generator used to generate random virtual cards.

Data communication device 16 receives and transmits game play data which is randomly generated as a result of playing the live table game. Processing device 12 facilitates comparing the game play data with the rules and/or criteria for winning the wagers stored in data storage device 14, and determining an outcome of the wagers placed on the live table game via data communication device 18 of gaming terminal 22. If the criteria are satisfied, then the wager is won, whereas if the criteria are not satisfied the wager is lost. Display device 20 of gaming terminal 22 is configured to facilitate the entry of wagers, show a live multimedia feed of the table game being played and communicate the outcome of any wagers placed.

System 10 is also configured to provide remote wagering games at gaming terminal 22. The remote wagering games have common features with at least one live table game that permit the game play data, specifically, the randomly generated gaming symbols, which are received as a result of playing the live table game, to be used by processing device 12 for resolving the remote wagering games according to the respective rules and/or criteria associated with the remote wagering games stored in data storage device 14.

System 10 is therefore configured for communicating the remote wagering games via gaming terminal 22 which may advantageously played in addition to or instead of the live table games, even though the remote wagering games may have different wagers, different rules, or both, provided that the amount of gaming symbols necessary to resolve wagers in the remote wagering game are generated as a result of playing the live table games.

For example, system 10 may be configured to provide the option for a player to enter into a live conventional blackjack game through gaming terminal 22. A player using gaming terminal 22 may choose to participate in the live blackjack game or play a remote Blackjack game in which the rules are different, such as the rules for dealing cards to reveal their value, or rules relating to the wager size (minimum, maximum, increment), or rules relating to payout associated with game symbols and symbol combinations, or rules allowing for a wild card, or in a blackjack variant in which the rules differ in any way from conventional blackjack. The cards dealt in the live game are correlated by system 10 with the cards to be received in the remote wagering game according to its rules in order to resolve all wagers placed in the remote wagering game.

System 10 may be configured to be responsive to an additional request for randomly generated game play data which may be necessary for resolving a remote wagering game. For example, system 10 may inform the dealer at the live table game through communication device 16 to continue to deal a certain number of randomly shuffled cards above the amount needed to resolve the live table game, or system 10 may be in communication with a random number generator for the purpose of generating any amount of random gaming symbols necessary to match the amount necessary in the remote wagering game or add on to the random gaming symbols acquired from the live table game.

In another example, system 10 is configured to provide the option for a player to enter into a live conventional blackjack or play a remote blackjack game which includes one or more side wagers. Players may place the side wager through player terminal 22. The randomly generated gaming symbols received via communication device 18 will be compared via processing device 12 with criteria for determining the outcome of the side wager stored in data storage 14. If the requisite gaming symbols have been received then the criteria will be satisfied and the side wager will be won.

For example, a remote blackjack game may allow for the player to wager on receiving a hand that has achieved a poker rank such as a pair. The randomly generated gaming symbols dealt in the live conventional Blackjack game are received and compared with the criteria that the gaming symbols corresponding to the player's hand in the remote blackjack game comprise two cards of the same rank.

In yet another example, the game of baccarat may be played live and broadcast to player terminal 22, along with various remote baccarat variant games that include different rules, such as no-commission versions, variations on pay tables, or which include additional side wagers, which may include progressive side wagers, mystery jackpots or bonuses. Thus, players at gaming terminal 22 are capable of participating in many variations of baccarat games with the same hand delivered in the live table game.

Players may therefore have a variety of options to play other wagering games than the live table game. However, system 10 may be configured so that only the remote wagering games that rely on the same amount or plurality of gaming symbols, or game variations that belong to the same game families (variations of Baccarat, Roulette, Sic-Bo, and the like) as those gaming symbols which are randomly generated in the live table game are offered as available to players through gaming terminal 22.

System 10 may be configured to provide a simulation of the remote wagering game wager on by players using gaming terminal 22. The simulation may be presented on display device 20 according to the rules of the remote wagering game and may take any form, such as a display of playing cards being dealt by a virtual dealer or the actual dealer in the live table game, which would enhance the overall player experience. System 10 may be configured to provide a new display or skin on display device 20 of gaming terminal 22 and provide customized playing cards for the remote wagering games to distinguish between games and provide proprietary information, among other things. Variations in game rules, wager size and pay tables affecting payout amounts and volatility that are different from that of the live table may also be applied to the games at the remote game terminals to provide a favorable personalized player experience.

Figure 2:
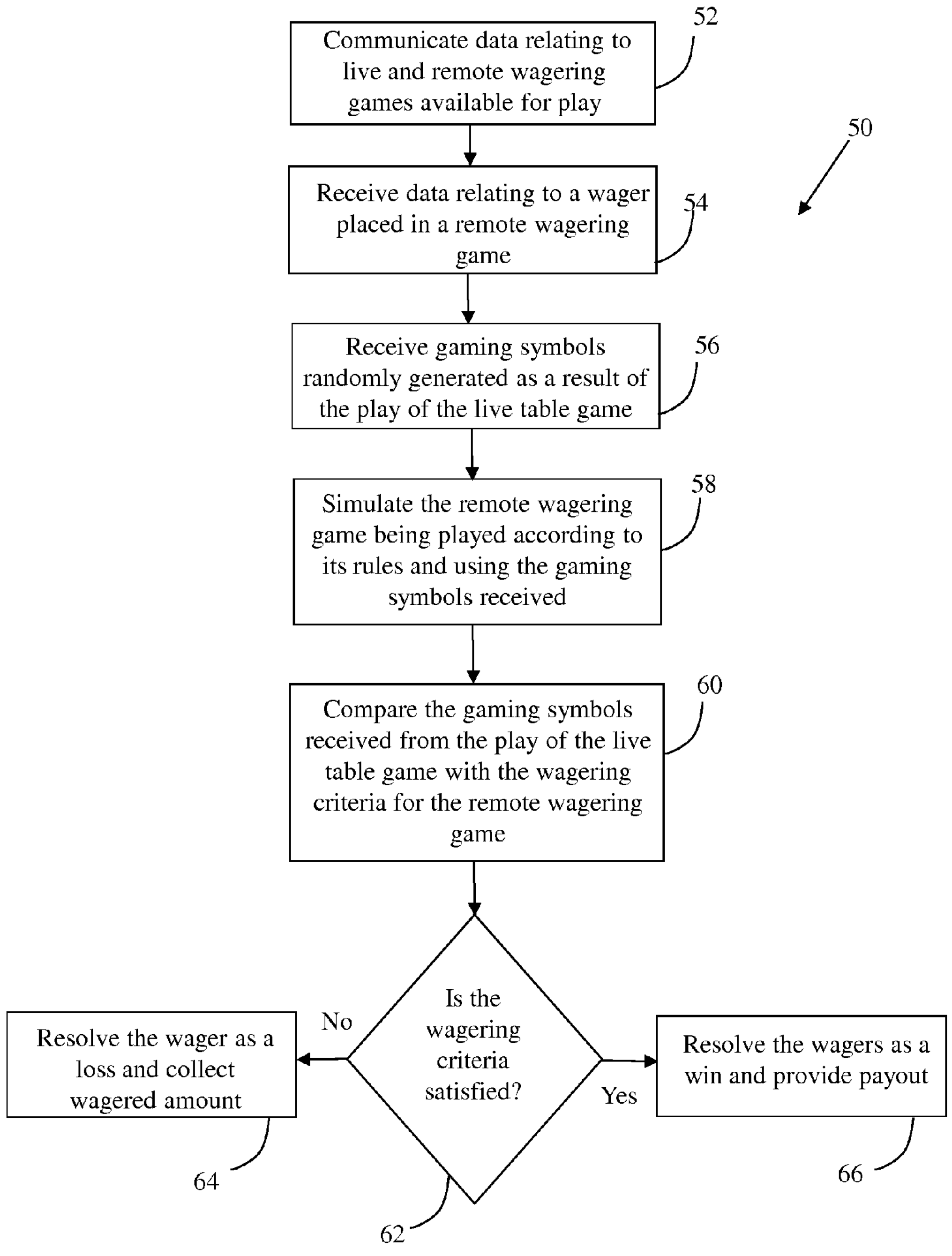
FIG. 2 is a flowchart of a method according to an embodiment of the present invention.

An exemplary method of operating the invention with a system such as system 10 is general referred to by the numeral 50 in FIG. 2.

As shown by step 52, system 10 communicates data relating to one or more live wagering games available for play and the corresponding remote wagering games available for remote play. The corresponding remote wagering games include game rules that may differ from the game rules of the live table game, but the outcome of wagers placed in the remote wagering games are determinable by comparing a wagering criteria for the remote wagering games, which may differ from the wagering criteria for the live table game, with the same gaming symbols randomly generated as a result of playing the live table game.

As shown by step 54, system 10 receives data relating to one or more wagers placed in connection with a remote wagering game. As discussed above, the data may be received via data communication device 18 in gaming terminal 22.

In step 56, system 10 receives gaming symbols randomly generated as a result of the play of the live table game corresponding to the remote wagering game in which wagers are placed in step 54. The gaming symbols may be received via data communication device 16 through any means which is likely to maintain the integrity of the wagering game.

Upon receiving the gaming symbols in step 56, system 10 may actuate a simulation of the remote wagering game being played via display device 20 of gaming terminal 22, as shown by step 58, with the simulation being conducted according to the rules of the remote wagering game. If all gaming symbols have been previously received then in some embodiments players may select to bypass the simulation.

As shown by step 60, system 10 compares the gaming symbols received from the play of the live table game with the wagering criteria for the remote wagering game to determine the outcome of any wagers placed. If the wagering criteria are not satisfied in step 62 then the wager is collected as a loss in step 64. If the wagering criteria are satisfied then the wager is a win and a payout is awarded in step 66. The payout may be awarded through gaming terminal 22 as cash or credit added to an account.

It should be understood that systems such as those described herein may be adapted and configured to function independently or may also interact with other systems or applications, such as for example, a casino management system or player tracking system. As such, the wagering data may be recorded and stored in connection with player information retrieved from the terminal.

Those skilled in the art will readily appreciate that any of the systems and methods of the invention may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as an existing electronic gaming machine, portable computing device or electronic platforms with multiple player positions. In addition, the system of the invention may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the invention so long as players and operators thereof are provided with useful access thereto or the opportunity to play the game as described herein.

It should be readily apparent that additional computerized or manual systems may also be employed in accordance with the invention in order to achieve its full implementation as a system, apparatus or method.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, and in the accompanying patents and patent applications, which disclose, systems, methods and features, all of which may be employed with the invention described herein.

The invention is claimed as follows:

1. A method of operating a gaming system, the method comprising:

(a) communicating data relating to a live table game being played at a physical gaming table, wherein an outcome of the live table game is based on a randomly determined plurality of physical game components and a first criteria associated with the live table game, (b) communicating data relating to a remote wagering game associated with a remote wager placed at a remote gaming terminal, wherein an outcome of the remote wagering game is based on a simulation of the randomly determined plurality of physical game components and a second, different criteria associated with the remote wagering game, and (c) determining any award for the remote wager placed based on the outcome of the remote wagering game.

2. The method of claim 1, wherein the first criteria is selected from the group consisting of: a first paytable, a first wager amount, a first minimum wager amount, a first maximum wager amount, a first side bet amount, a first progressive award amount, and a first bonus award amount.

3. The method of claim 2, wherein the second criteria is selected from the group consisting of: a second, different paytable, a second, different wager amount, a second, different minimum wager amount, a second, different maximum wager amount, a second, different side bet amount, a second, different progressive award amount, and a second, different bonus award amount.

4. The method of claim 1, wherein the second criteria comprises the first criteria and a side wager criteria.

5. The method of claim 1, wherein at least one of the outcome of the live table game and the outcome of the remote wagering game is based on a plurality of gaming symbols randomly generated in association with the play of the live table game.

6. The method of claim 1, which comprises communicating data relating to another remote wagering game associated with another remote wager placed at another remote gaming terminal, wherein an outcome of the other remote wagering game is based on another simulation of the randomly determined plurality of physical game components and a third, different criteria associated with the other remote wagering game.

7. A gaming system comprising:

a physical gaming table upon which a live table game is played, wherein an outcome of the live table game is based on a randomly determined plurality of physical game components and a first criteria associated with the live table game, and a remote gaming terminal which includes a processor programmed to:

receive data associated with the play of the live table game, receive a placement of a remote wager on a play of a remote wagering game, wherein an outcome of the remote wagering game is based on a simulation of the randomly determined plurality of physical game components and a second, different criteria associated with the remote wagering game, and determine any award for the remote wager placed based on the outcome of the remote wagering game.

8. The gaming system of claim 7, wherein the first criteria is selected from the group consisting of: a first paytable, a first wager amount, a first minimum wager amount, a first maximum wager amount, a first side bet amount, a first progressive award amount, and a first bonus award amount.

9. The gaming system of claim 8, wherein the second criteria is selected from the group consisting of: a second, different paytable, a second, different wager amount, a second, different minimum wager amount, a second, different maximum wager amount, a second, different side bet amount, a second, different progressive award amount, and a second, different bonus award amount.

10. The gaming system of claim 7, wherein the second criteria comprises the first criteria and a side wager criteria.

11. The gaming system of claim 7, wherein at least one of the outcome of the live table game and the outcome of the remote wagering game is based on a plurality of gaming symbols randomly generated in association with the play of the live table game.

12. The gaming system of claim 7, which comprises another remote gaming terminal which includes another processor programmed to:

receive data associated with the play of the live table game, receive a placement of another remote wager on another play of another remote wagering game, wherein an outcome of the other remote wagering game is based on another simulation of the randomly determined plurality of physical game components and a third, different criteria associated with the remote wagering game, and determine any award for the other remote wager placed based on the outcome of the other remote wagering game.

13. A gaming terminal comprising:

a display device;

an input device; and a processor programmed to operate with the display device and the input device to:

receive data associated with a play of a live table game at a remote physical gaming table, wherein an outcome of the live table game is based on a randomly determined plurality of physical game components and a first criteria associated with the live table game, receive a placement of a wager on a play of a wagering game, wherein an outcome of the wagering game is based on a simulation of the randomly determined plurality of physical game components and a second, different criteria associated with the wagering game, and determine any award for the wager placed based on the outcome of the wagering game.

14. The gaming terminal of claim 13, wherein the first criteria is selected from the group consisting of: a first paytable, a first wager amount, a first minimum wager amount, a first maximum wager amount, a first side bet amount, a first progressive award amount, and a first bonus award amount.

15. The gaming terminal of claim 14, wherein the second criteria is selected from the group consisting of: a second, different paytable, a second, different wager amount, a second, different minimum wager amount, a second, different maximum wager amount, a second, different side bet amount, a second, different progressive award amount, and a second, different bonus award amount.

16. The gaming terminal of claim 13, wherein the second criteria comprises the first criteria and a side wager criteria.

17. The gaming terminal of claim 13, wherein at least one of the outcome of the live table game and the outcome of the wagering game is based on a plurality of gaming symbols randomly generated in association with the play of the live table game.

* * * * *